United States Patent
Huitema et al.

(10) Patent No.: US 7,068,789 B2
(45) Date of Patent: Jun. 27, 2006

(54) PEER-TO-PEER NAME RESOLUTION PROTOCOL (PNRP) GROUP SECURITY INFRASTRUCTURE AND METHOD

(75) Inventors: Christian Huitema, Clyde Hill, WA (US); Alexandru Gavrilescu, Redmond, WA (US); Xiaohai Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 09/955,924

(22) Filed: Sep. 19, 2001

(65) Prior Publication Data

US 2003/0056093 A1   Mar. 20, 2003

(51) Int. Cl.
 *H04L 9/00* (2006.01)
(52) U.S. Cl. .......................... 380/277; 726/14; 726/15; 713/151; 713/152; 713/155; 713/156; 713/157; 713/158; 713/161; 713/168; 713/169; 713/170; 713/171; 713/175; 713/176; 709/205
(58) Field of Classification Search ........ 713/200–202, 713/168–185, 163, 155–158, 151–152, 161; 380/231, 241, 278, 30, 277; 709/205; 726/14–15
See application file for complete search history.

(56) References Cited

U.S. PATENT DOCUMENTS

| | | | | |
|---|---|---|---|---|
| 5,712,914 | A * | 1/1998 | Aucsmith et al. ............. 380/30 |
| 5,748,736 | A * | 5/1998 | Mittra ......................... 713/163 |
| 5,987,376 | A | 11/1999 | Olson et al. |
| 6,016,505 | A * | 1/2000 | Badovinatz et al. ........ 709/205 |
| 6,092,201 | A * | 7/2000 | Turnbull et al. ............. 713/201 |
| 6,266,420 | B1 * | 7/2001 | Langford et al. ........... 380/282 |
| 6,351,813 | B1 * | 2/2002 | Mooney et al. ............. 713/185 |
| 6,748,530 | B1 * | 6/2004 | Aoki ........................... 713/156 |
| 2002/0144149 | A1 * | 10/2002 | Hanna et al. ................ 713/201 |
| 2002/0194484 | A1 * | 12/2002 | Bolosky et al. ............. 713/189 |

OTHER PUBLICATIONS

Adam Langley, *The Freenet Protocol*, The Free Network Project, at http://freenet.sourceforge.net/index.php?page=protocol (last visited May 21, 2001).
Philip J. Erdelsky, *The Birthday Paradox*, EFG, at http://www.efgh.com/math/birthday.htm (last visited Mar. 8, 2002).

(Continued)

*Primary Examiner*—Christopher Revak
*Assistant Examiner*—Longbit Chai
(74) *Attorney, Agent, or Firm*—Microsoft Corporation (57) ABSTRACT

A method for ensuring valid and secure peer-to-peer communications in a group structure. Specifically, the system of the present invention presents a method of ensuring secure peer-to-peer group formation, group member addition, group member eviction, group information distribution, etc. Such functionality may be distributed to the individual peers in the group to further enhance the overall security of the group while enhancing flexibility. The P2P group security allows every peer who is a valid member of the group to invite new members. The recipients of these invitations are then able to contact any member of the group to join the group, not only the inviter. Further, groups may function when the group creator is not online. Likewise, the method allows the creation of secure groups with users from different security domains, relying on their security credentials in those domains for initial authentication.

23 Claims, 6 Drawing Sheets

OTHER PUBLICATIONS

*Red-Black Tree,* National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay,* at Department of Computer Science at Stanford University, 13 pages.

Rowstron, Antony, and Peter Druschel, *Pastry: Scalable, distributed object location and routing for large-scale peer-to-peer systems,* at Microsoft Research, Ltd., St. George House and Rice University, 20 pages.

Druschel, Peter, and Antony Rowstron, *PAST: A large-scale, persistent peer-to-peer storage utility,* at Rice University and Microsoft Research, 6 pages.

Rowstron, Antony, and Peter Druschel, *Storage management and caching in PAST, a large-scale, persistent peer-to-peer storage utility,* at Microsoft Research, Ltd., St. George House and Rice University, 14 pages.

Rowstron, Antony, Anne-Marie Kermarrec, Peter Druschel, and Miguel Castro, *SCRIBE: The design of a large-scale event notification infrastructure,* at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service,* at MIT Laboratory for Computer Science, 6 pages, at http://pdos.lcs.mit.edu/chord.

Ellison, C., *SPKI Requirements,* (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate,* (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory,* (The Internet Society 1999), at http://www.ietf.org/rfc/rfc2693.txt?number=2693 (last visited Aug. 6, 2001).

* cited by examiner

PEER-TO-PEER NAME RESOLUTION PROTOCOL (PNRP) GROUP SECURITY INFRASTRUCTURE AND METHOD

FIELD OF THE INVENTION

The present invention relates generally to group management in a peer-to-peer infrastructure, and more particularly to group security infrastructures and methods for groups formed via peer-to-peer protocols.

BACKGROUND OF THE INVENTION

Peer-to-peer communication, and in fact all types of communication, depend on the possibility of establishing valid connections between selected entities. These entities may be peers (e.g., users or machines) or groups formed within a peer-to-peer network. However, entities may have one or several addresses that may vary because the entities move in the network, because the topology changes, because an address lease cannot be renewed, because the group function or purpose has changed, etc. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their individual or group address(es) through various mechanisms. Some protocols also allow a client to acquire knowledge of other entities' addresses through the processing of requests from others in the network. Indeed, it is this acquisition of address knowledge that enables successful operation of these peer-to-peer networks. That is, the better the information about other peers and groups in the network, the greater the likelihood that a search for a particular resource will converge.

However, without a robust security infrastructure underlying the peer-to-peer protocol, malicious entities can easily disrupt the ability for such peer-to-peer systems to converge. Such disruptions may be caused, for example, by an entity that engages in identity theft. In such an identity theft attack on the peer-to-peer network, a malicious node publishes address information for IDs with which it does not have an authorized relationship, i.e. it is neither the owner nor a group member, etc. A malicious entity could also flood the network with bad information so that other entities in the network would tend to forward requests to non-existent nodes (which would adversely affect the convergence of searches), or to nodes controlled by the attacker.

While validation of an address certificate may prevent the identity theft problem, such is ineffective against this second type of attack. An attacker can continue to generate verifiable address certificates (or have them pre-generated) and flood the corresponding IDs in the peer-to-peer cloud. If any of the nodes attempts to verify ownership of the ID, the attacker would be able to verify that it is the owner for the flooded IDs because, in fact, it is. However, if the attacker manages to generate enough IDs it can bring most of the peer-to-peer searches to one of the nodes controlled by him. At this point the attacker can fairly well control and direct the operation of the network.

If the peer-to-peer protocol requires that all new address information first be verified to prevent the identity theft problem discussed above, a third type of attack becomes available to malicious entities. This attack to which these types of peer-to-peer networks are susceptible is a form of a denial of service (DoS) attack. If all the nodes that learn about new records try to perform the ID ownership check, a storm of network activity against the advertised ID owner will occur. Exploiting this weakness, an attacker could mount an IP DoS attack against a certain target. For example, if a malicious entity advertises Microsoft's Web IP address as the ID's IP, all the nodes in the peer-to-peer network that receive this advertised IP will try to connect to that IP (Microsoft's Web server's IP) to verify the authenticity of the record. Of course Microsoft's server will not be able to verify ownership of the ID because the attacker generated this information. However, the damage has already been done. That is, the attacker just managed to convince a good part of the peer-to-peer community to attack Microsoft.

A malicious entity could also attempt to disrupt the operation of the peer-to-peer network by trying to ensure that searches will not converge. Specifically, an attacker could attempt to affect the effectiveness of the search algorithm used by the peer-to-peer protocol to implement a sort of DoS attack for searches. For example, instead of forwarding the search to a node in its cache that is closer to the ID to aid in the convergence of the search, it could forward the search to a node that is further away from the requested ID. Alternatively, the malicious entity could simply not respond to the search request at all.

At the peer-to-peer group level, additional security concerns become apparent. Because many groups are established to isolate information shared within the group from other peers in the peer-to-peer network, controlling group membership becomes important to maintain that isolation. However, malicious nodes may spoof membership of the group and distribute the group information beyond the group. Likewise, malicious nodes may improperly expand the group by inviting other peers into the group. Even if the malicious node is discovered and properly excluded from the group, current systems have no way of identifying which of the group members were improperly invited into the group by the malicious node. These malicious nodes may also improperly exclude members from the group by issuing revocations to these members. One approach to overcome these problems is to have a group owner that has sole authority to invite, accept, and reject group members. However, as discussed above, without a strong security infrastructure the owner's identity may be spoofed, or DoS attacks may be perpetrated on the group owner, etc. Further, such systems typically cannot maintain the group if the group creator is offline.

There exists, therefore, a need in the art for a peer-to-peer security framework that addresses the above-described threats at a group level that can adversely affect the peer-to-peer group.

BRIEF SUMMARY OF THE INVENTION

The inventive concepts disclosed in this application involve a new and improved method for ensuring valid and secure peer-to-peer communications in a group structure. Specifically, the system of the present invention presents a method of ensuring secure peer-to-peer group formation, group member addition, group member eviction, group information distribution, etc. Such functionality may be distributed to the individual peers in the group to further enhance the overall security of the group while enhancing flexibility.

In one embodiment of the present invention the P2P group security allows every peer who is a valid member of the group to invite new members. The recipients of these invitations are then able to contact any member of the group to join the group, not only the inviter. Further, an embodiment of the system of the present invention allows groups to function when the group creator is not online. Likewise, an embodiment of the present invention allows the creation of secure groups with users from different security domains, relying on there security credentials in those domains for initial authentication.

In one embodiment of the present invention, a method of forming a secure peer-to-peer group comprises the steps of generating a group public/private key pair, generating a group identification as a hash of the group public key, and defining group security properties. In an alternate embodiment for use in a secure peer-to-peer group having a predefined public/private key pair ($P_G/K_G$), a method of inviting a peer to join the group, comprises the steps of obtaining a public key ($P_{U1}$) of a peer, forming a first group membership certificate containing the peer's public key ($P_{U1}$) and a second membership certificate signed with the group private key ($K_G$). The first group membership certificate is preferably signed with a private key of an issuer ($K_{U2}$). The method also includes the step of sending the group membership certificate to the peer to invite the peer to join the group.

In another embodiment of the present invention, a method of securely joining a peer-to-peer group by a peer having a public and a private key is presented. This method comprises the steps of receiving a group invitation containing an invitation certificate having a group ID provided, resolving the group ID to find a member of the group, sending a connect message to the member containing the invitation certificate signed with the private key, receiving an accept message from the member containing a group membership certificate signed by a private key of the member, and receiving a group shared key to enable decryption of group traffic. A further embodiment presents a method of securely admitting a peer to a peer-to-peer group. This method comprises the steps of receiving a connect message from the peer containing an invitation certificate signed by a private key of the peer, authenticating the invitation certificate signed by the peer's private key, and when the step of authenticating is successful, sending an accept message to the peer, and sending a group shared key to the peer.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
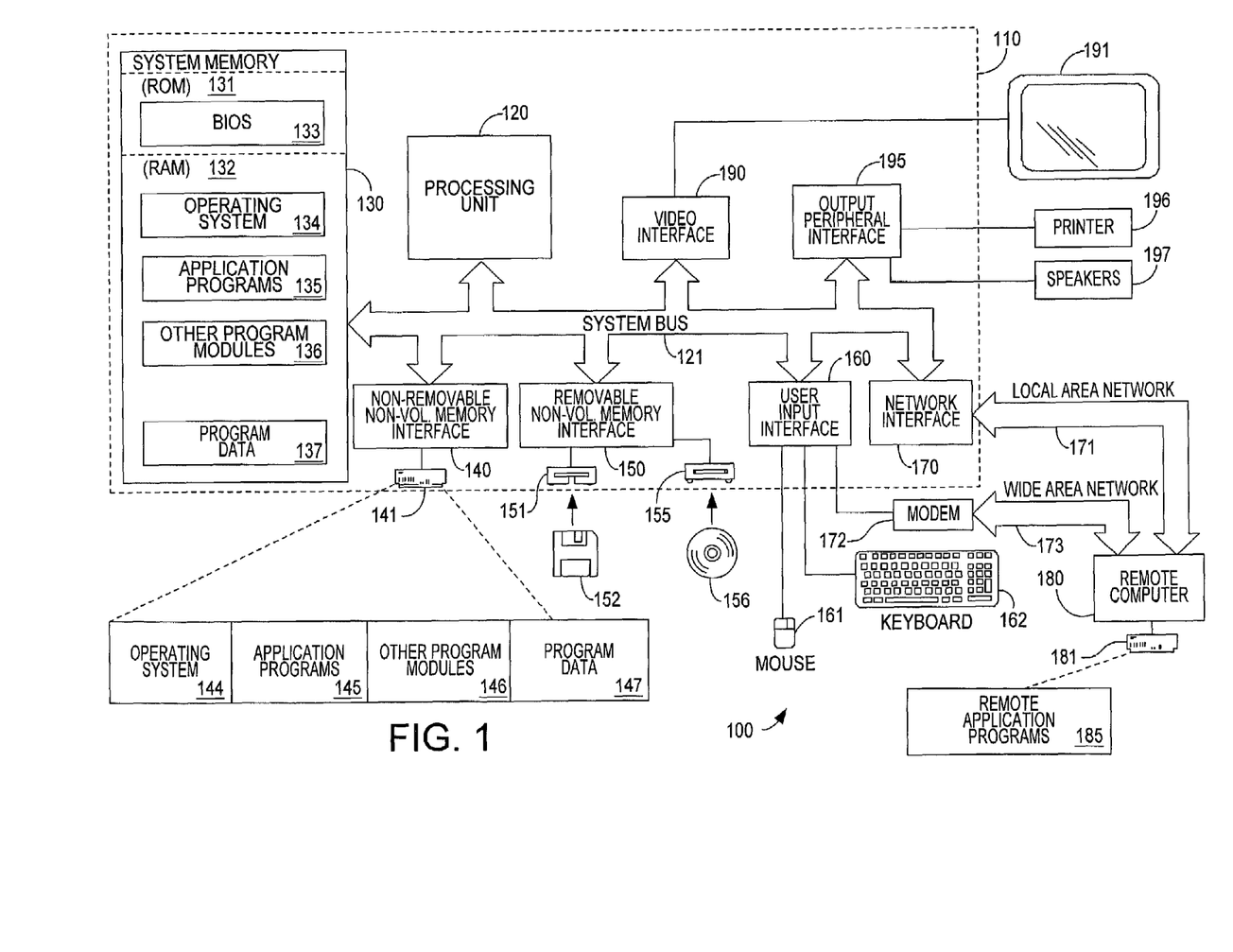
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peertopeer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peertopeer name resolution protocol (PNRP) to which the group security infrastructure of the instant invention finds particular applicability is described in co-pending application Ser. No. 09/942,164, entitled Peer-To-Peer Name Resolution Protocol (PNRP) And Multilevel Cache For Use therewith, filed on Aug. 29, 2001, and in co-pending application Ser. No. 09/955.923, entitled Peer-To-Peer Group Management and Method For Maintaining Peer-To-Peer Graphs, filed on even date herewith, the teachings and disclosure of which are hereby incorporated in their entireties by reference thereto. However, one skilled in the art will recognize from the following teachings that the group security infrastructure and methods of the present invention are not limited to the particular peer-to-peer protocol of these co-pending applications, but may be applied to other protocols with equal force. Likewise, co-pending application Ser. No. 09/956, 260, entitled Peer-To-Peer Name Resolution Protocol (PNRP) Security Infrastructure And Method, filed on even date herewith, describes an underlying security infrastructure that ensures that the identities of the various entities within the network are valid, without unnecessary burdening the network with excess traffic. The teachings and disclosure of this application are also incorporated in their entireties by reference thereto.

As discussed in the above-incorporated co-pending application describing the PNRP and to provide some useful background, establishing peering relations between individual peers is an expensive process in existing peer-to-peer networks. In the PNRP, however, each node accumulates a routing table that contains a list of references to other nodes in the network. For each node entry, address information, which may include a node identification, address, the key of the node, and the distance between the key of this node and the key of the local node are obtained. Each time the local node learns about a remote node, it checks whether the node is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a node receives a query it searches for the entry in its routing table whose key best matches the target, excluding the nodes that have already been visited. The query is then forwarded directly to the node that advertised the entry. If there is no adequate entry, the request is sent back to the node from which the request was received; this node will try another entry in its own routing table. The request is successful if it reaches the entry whose key matches the target. It is unsuccessful if the target is not reached in the maximum number of steps, or if the node from which the request was received tries all possible neighbors and receives a negative response. In the case of successful requests, the response is relayed by all intermediate hops. It carries the address of the node that held the target key, and this entry can be inserted in the routing tables of the intermediate nodes.

To allow this protocol to operate properly with valid information, the underlying security infrastructure described in the above-identified application utilizes an underlying trust model. In this model, it is assumed that private-public key encoding is trusted. That is, it is trusted that for one public key there is one and only one private key that can be used to perform the reverse cryptographic operation. Also, private-public key unique generation is trusted. That is, the algorithm for generating private-public keys is trusted to produce unique key pairings every time it is run. Neighbors that sent good records before are trusted to send good records in the future. Further, licensed software may also be trusted. That is, nodes that are running licensed software are trusted to implement the PNRP algorithms or other P2P algorithms and implement the security infrastructure described therein. The group security infrastructure of the present invention builds on this underlying PNRP security infrastructure and utilizes aspects of the trust model as will be discussed below.

It is instructive to note that, in view of this trust model, the PNRP security infrastructure computes the entity's identity (ID) as a 128-bit hash of the public key of a self-generated RSA key pair. The public key used to generate the ID can also be the public key of one of the X.509 certificates that an entity owns. Other methods of unique ID generation may be used as appropriate, provided that they are able to scale to the desired network size while still ensuring global uniqueness of the ID. In one embodiment of the PNRP security infrastructure, the uniqueness of the identity is ensured by the algorithm that generates the asymmetric key pairs.

As with many successful P2P protocols, entities (both individual peers as well as groups) can be published for easy discovery. To provide security and integrity to the P2P protocol, however, each identity preferably includes an attached identity certificate. The keeper of the ID's private key uses the certificate to attach additional information to the ID, such as the IP address, friendly name, etc. Preferably, each node generates its own pair of private-public keys, although such may be provided by a trusted supplier. The public key is then included as part of the node identifier.

Likewise, a group creator generates group public and private keys. Only the node that created the pair of keys has the private key with which it can prove that it is the creator of the identity. In this way, identity theft may be discovered, and is, therefore, deterred.

While the above-identified PNRP security infrastructure application discusses the mechanisms for ensuring that valid information and peer identities are maintained, the formation and operation of groups within a P2P network presents additional and unique challenges that the group security infrastructure of the present invention addresses. For example, at the group creation time the group creator may specify the group security properties. Through the group security infrastructure of the present invention, these properties may define a group whose security ranges from totally open, unsecured groups to closed, highly secured groups.

At the root there are several group security properties that the present invention allows to be combined. A group may have no explicit owners, or the creator can specify a list of co-owners. With respect to admission of group members, the system of the present invention allows a group to be open to everybody, requires that a peer request approval from the owner(s), or may be closed such that only the owner(s) can add new members. The system also allows user accounts to have no restrictions, allows pseudonymous accounts (Passport, Hotmail, etc.), and may restrict user accounts such that nodes have to present proper user credentials. With respect to encryption, the system of the present invention allows for both message integrity only, i.e. records advertised inside the group are signed, and message integrity plus privacy, i.e. records advertised inside the group are signed and encrypted. Other options available through the group security infrastructure of the present invention allows reputation not to be tracked, or for such reputation to be tracked through a member nodes reputation system. In such a system, every identity within the group has a reputation score that can be seen by other members of the group.

To provide a context for the present invention, some examples of group security in other group systems are provided. Systems that have what may be considered low security provide no authentication, are reputation based, and seek to ensure message integrity only. Such systems include, e.g., large groups for sharing music files such as Napster. Systems that have a medium level of security are typically characterized by anonymous accounts that require authentication, are also reputation based, and seek to maintain message integrity only (e.g. EBay). Security at a high level typically would require strong user authentication, and provide message integrity and privacy (e.g. Groove workgroups). While each of these types of systems provide certain benefits, none provide the flexibility or security of the present invention.

As discussed above, an entity's identity (ID) may be formed as a 128-bit hash of the public key of a self-generated RSA key pair. The public key used to generate the ID can also be the public key of one of the X.509 certificates that a peer owns. Other methods of unique ID generation may be used as appropriate, provided that they are able to scale to the desired network size while still ensuring global uniqueness of the ID. In one embodiment, the uniqueness of the identity is ensured by the algorithm that generates the asymmetric key pairs. As indicated above, an entity may also be a group. Therefore, the group identity may also be formulated in this way.

As also discussed in this above-identified application, peer identification certificates provide integrity and validity to a peer's identity in the P2P network. These ID certificates are of the form [Version, ID, <ID Related Info>, Validity, Algorithms, $P_{Issuer}$]$K_{Issuer}$. As used in this certificate representation, Version is the certificate version, ID is the identifier to be published, <ID Related Info> represents information to be associated with the ID, Validity represents the period of validity expressed in a pair of From-To dates expressed as Universal Date Time (aka GMT), Algorithms refers to the algorithms used for generating the key pairs, and for signing, and $P_{Issuer}$ is the public key of the certificate issuer. If the certificate issuer is the same as the ID owner then this can be left blank. In such a case it is assumed that $P_{Issuer}=P_{ID}$. The term $K_{Issuer}$ is the private key pair of $P_{Issuer}$. If the certificate issuer is the ID owner then this is $K_{ID}$, the private key of the ID owner.

In the P2P group context, an embodiment of the present invention provides a group membership certificate of similar structure wherein the <ID Related Info> comprises the Peer ID that is certified as the member of the group, and a certificate Serial Number. Such a group membership certificate is of the structure [Version, ID, Peer ID, Serial Number, Validity, Algorithms, $P_{ID}$, $P_{Issuer}$]$K_{Issuer}$. As used therein, ID is the Group ID, Peer ID is the Peer ID that is certified as a member of the group, Serial Number is the certificate serial number per issuer. The system of the present invention allows every issuer to keep its own numbering scheme. Preferably, certificate serial numbers are unique in the context of the same issuer. The Validity refers to the period of validity expressed in a pair of From-To dates, $P_{ID}$ is the public key from which the ID was derived, and $P_{Issuer}$ is the public key of the certificate issuer. If the certificate issuer is the same as the ID owner then this field can be left blank and it will be assumed that $P_{Issuer}=P_{ID}$. $K_{Issuer}$ is the private key pair of $P_{Issuer}$. If the certificate issuer is the ID owner then this is $K_{ID}$, the private key pair of the ID owner.

This group membership certificate may be used to verify that the specified Peer ID is a member of the group with the specified group ID. This information is signed with the private key of the issuer $K_{Issuer}$. Depending on the group security policy selected, any group member or only a smaller set called group owners can be certificate issuers. In all cases, however, to verify that the issuer is certified to issue such certificates a chain of group membership certificates has to exist that leads to a certificate signed with the group private key.

As discussed in the above-identified application, the following conditions have to be met for a certificate to be valid. The certificate signature must valid, and the certificate cannot be expired. That is, the current date expressed as UDT must be in the range specified by the Validity field. The hash of the public key must also match the ID. If the Issuer is the same as the ID owner then the hashing of the issuer's public key into the ID has to verify (i.e. ID=hash($P_{ID}$)). If the $P_{Issuer}$ is different from $P_{ID}$ then there must be a chain of certificates leading to a certificate signed with $K_{ID}$. Such a chain verifies the relationship between the issuer and the ID owner. When the system of the present invention determines that ID ownership verification is appropriate, the node (N) verifies that the contact advertised with the ID as the ID owner (O) has the private key that pairs with the public key from which the ID was hashed. To accomplish this, N obtains the public key of the ID, for example by asking O, by looking it up in a public key directory, or by using the public key contained in the ID certificate. N then hashes the public key and verifies that the ID matches the one to be published. Once this verification is complete, N verifies that O is the holder of the private key. To do this, N sends to O a challenge encrypted with O's public key. O decrypts the challenge with the private key and sends back to N the challenge.

Besides this basic certificate validation of P2P certificates, validation of group membership certificates adds an additional check that will be performed. This will ensure that the certificate, or any certificate in the membership chain, has not been revoked (i.e. is not in the Group Certificate Revocation List (GCRL) to be discussed below). By refining the group membership certificate validation in this way, the system of the present invention implements an algorithm that allows quick renewal of membership certificates when any of the certificates in the membership chain has been revoked.

The group certificate revocation list (GCRL) is a collection of issuer certificate revocation lists (ICRL), which are published by every certificate issuer. The ICRLs are replicated across all the active group members, and together they form the GCRL. Every certificate issuer publishes in his list the group membership certificates that it has revoked. Certificates issued by a certain issuer can be revoked only by that certificate issuer. A revoked certificate is published in the ICRL until the certificate expires and thus becomes invalid by itself. An issuer updates its list every time it needs to add or remove entries from the list. The format of the ICRL is [Last Update, $P_{Issuer}$, 1*{Serial Number, Revocation Date}]$K_{Issuer}$. In this ICRL the Last Update is the time when the list was updated, $P_{Issuer}$ is the public key of the issuer, Serial Number is the serial number of the certificate revoked, the Revocation Date is the date (in UDT) when the certificate was revoked, and $K_{Issuer}$ is the issuer's private key used to sign the list.

To aid in the proper operation and ensure the security of the group, the active members of the group maintain a set of live data that is common for the whole group. This group shared data includes the group security configuration that is created by the group creator and signed with the group private key. As such, this data can be modified only by the group creator. The group shared data also includes a list of owners, the admission type (open, controlled, closed), the acceptable authentication methods (Passport, Kerberos, NTLM, PKI, etc.), and an indication of the required encryption (message integrity only or message integrity+privacy). The data may also include the type of reputation that is to be used in the group, e.g. whether to track reputation or not, and by what method. A shared secret for encryption may be included. The group certificate revocation list (GCRL), which, as just discussed, is a collection of the issuer certificate revocation lists (ICRLs) each signed by its issuer is also included.

In the P2P group security infrastructure of the present invention, data encryption can be implemented two ways: on a per connection basis or on a per group basis. In the per connection basis a peer establishes and maintains an encryption key for every connection. The benefit of such a system is that when a peer is removed from a group, the group can continue its activity without requiring all the connections to be reestablished. However, this results in additional computing overhead because a message traversing the group through multiple peers has to be decrypted and re-encrypted repeatedly. In the per group basis a shared secret used for encrypting traffic in the group is maintained by all the active members of the group. While this solves the above re-encryption problem, every time a member disconnects from the group a new encryption key has to be negotiated and distributed to all the members of the group.

Figure 2:
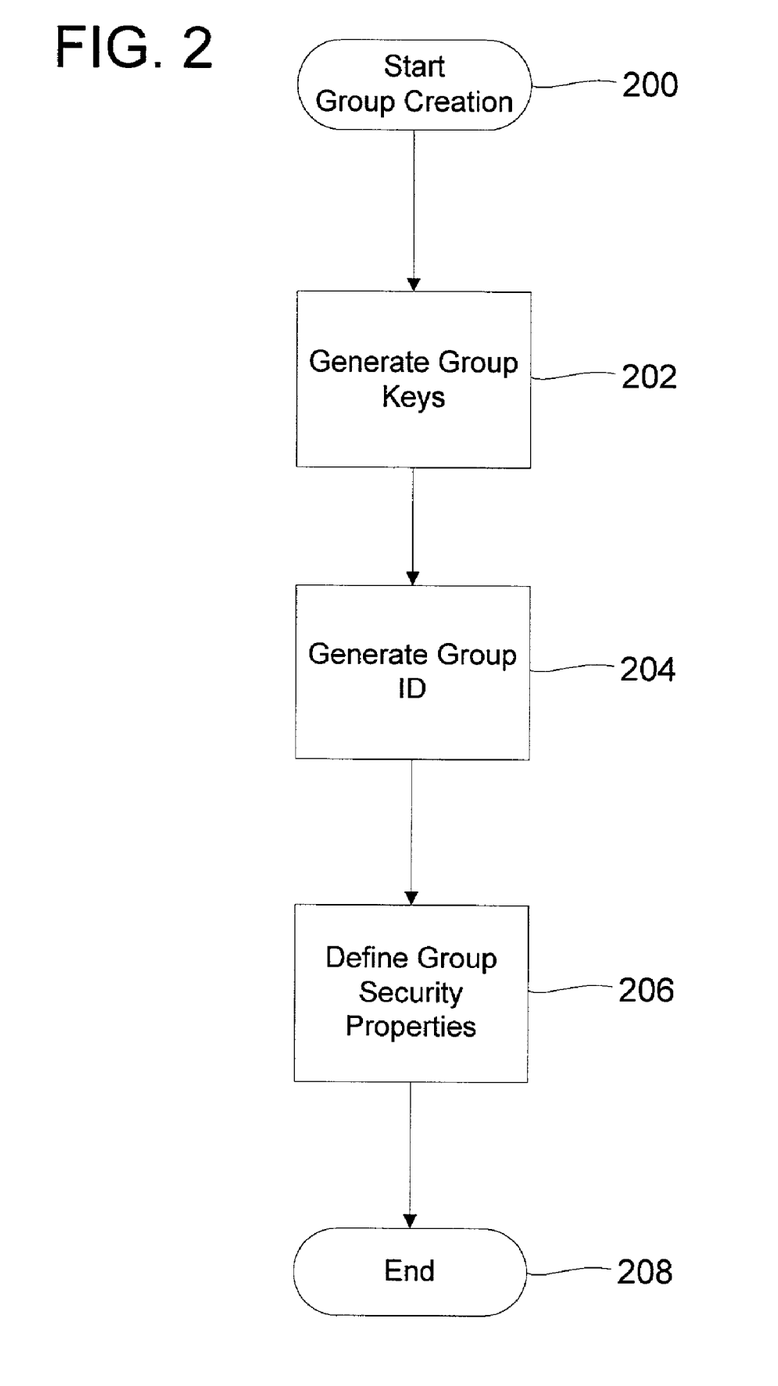
FIG. 2 is a simplified flow diagram illustrating secure peer-to-peer group creation in accordance with an embodiment of the present invention.

Secure P2P group creation through the infrastructure of the present invention is greatly simplified over other systems and any P2P Peer can create a new group as illustrated in FIG. 2. Once this creation process has begun 200, the first step is the generation of a group of private-public keys 202. Specifically, the owner $O_1$ creates the group and generates the keys $P_G$ (the group public key), $K_G$ (the group private key), and $S_G$ (the group shared key used for message encryption). The group creator has a special role inside the group because it is the only node that has the group private key. As discussed above, the group ID is generated 204 by hashing the group public key. The group creator then specifies the security attributes for the group and creates a group properties record signed with the group private key 206. This record will be flooded inside the group as part of the group shared information. Once these steps are complete, the process of group creation ends 208.

As with individual peer IDs, a group may be published in PNRP. If the group is marked as public any node that is currently a member of the group can publish his address as a group contact address. To do so the current member creates a PNRP address certificate with the Group ID, one of its IPv6 addresses, and signs it with its private key. The nodes have to have the chain of group membership certificates with them to prove that they are members of the group when somebody challenges them as discussed above. The group creator could use the group private key to sign the address certificate, but this is not recommended if the group creator does not want to reveal its special role outside the group scope. The group creator obeys the same rules as any other group member and uses its private key to sign the address certificate.

Figure 3:
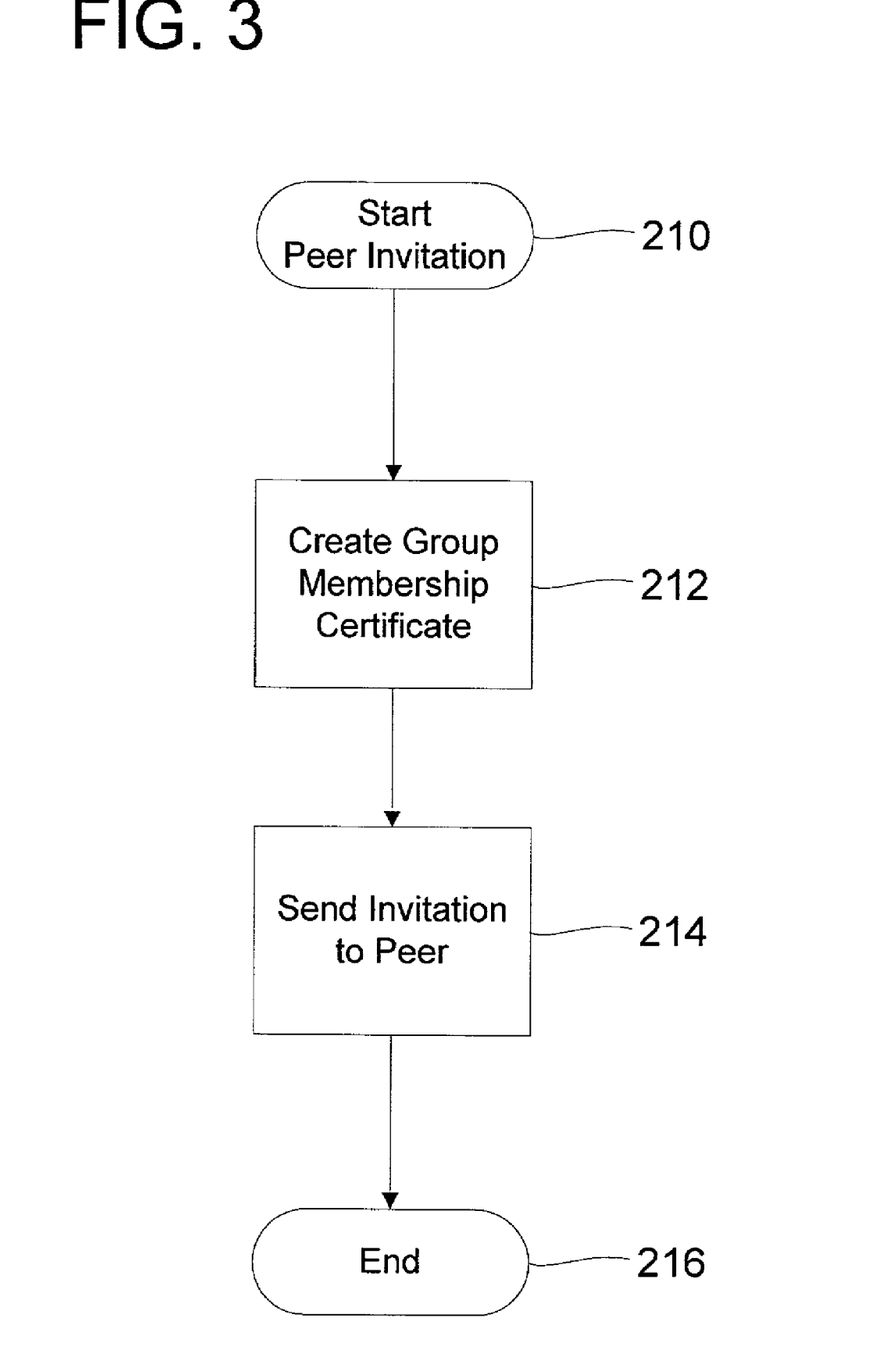
FIG. 3 is a simplified flow diagram illustrating secure peer-to-peer group invitation in accordance with an embodiment of the present invention.

As an example of a peer invitation when the group creator already knows the public keys of those he wishes to invite as members we turn to FIG. 3. In this example assume that the Owner first invites member U1. Once this process is started 210, the Owner creates a Group certificate 212 containing the member's (U1) public key signed with the Group Private Key. This can be represented as $(P_{U1})K_G$. The Owner then sends 214 the invitation to U1 via email. This invitation mail contains a URL containing the Group PNRP ID and certificate. This may be represented as O1→P2P:// PNRP_ID_OF_GROUP; cert=$(P_{U1})K_G$→U1. This ends the peer invitation phase 216.

Figure 4:
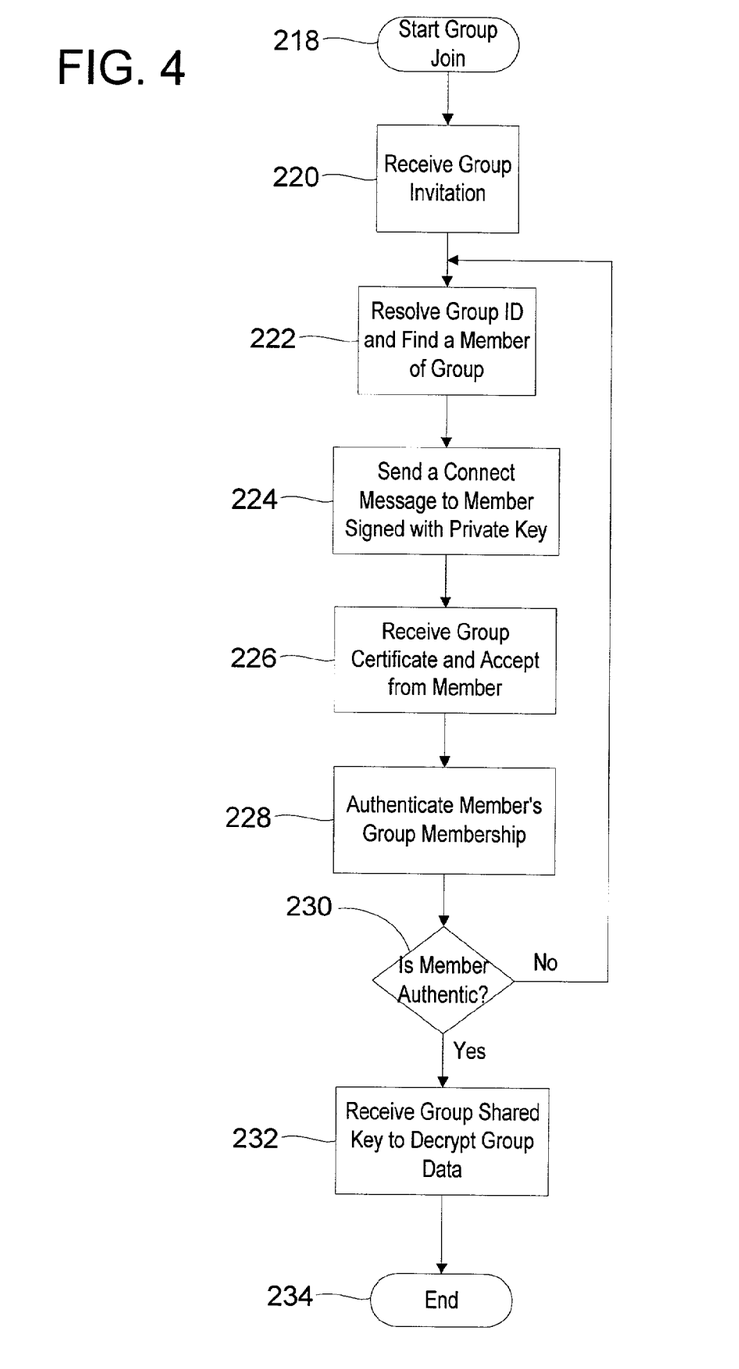
FIG. 4 is a simplified flow diagram illustrating the process of securely joining a peer-to-peer group in accordance with an embodiment of the present invention.

The process of joining the group starts 218 when the peer receives 220 the group invitation as illustrated in FIG. 4. U1 clicks on the URL and invokes the P2P code. PNRP is used to resolve 222 the group ID and discover one online group member, in this example U2. U1 sends 224 a connect message to U2 that contains the Group certificate signed with U1's private key. This now proves that U1 is allowed to join the group and that the node issuing the join is U1. This may be represented as U1→connect; $((P_{U1})K_G)K_{U1}$→U2. U2 then responds by sending its group certificate to prove that it is a group member, which is received at step 226. That is, U2→accept; $((P_{U2})K_G)K_{U2}$→U1. U1 then verifies the authenticity of U2's certificate at step 228. If U2's certificate is not authentic 230, the U1 resolves another group member 222. If U2's certificate is valid 230, then at this point both are authenticated. U2 then gives U1 the current shared encryption key 232, which is encrypted with U1's Public Key to protect the transfer. That is, U2→key; $\{S_G\}P_{U1}$→U1. U1 is now an authenticated group member and can encrypt/decrypt group traffic 234. In this way, an owner may decide who can join the group, but allows any online member to admit them.

Figure 5:
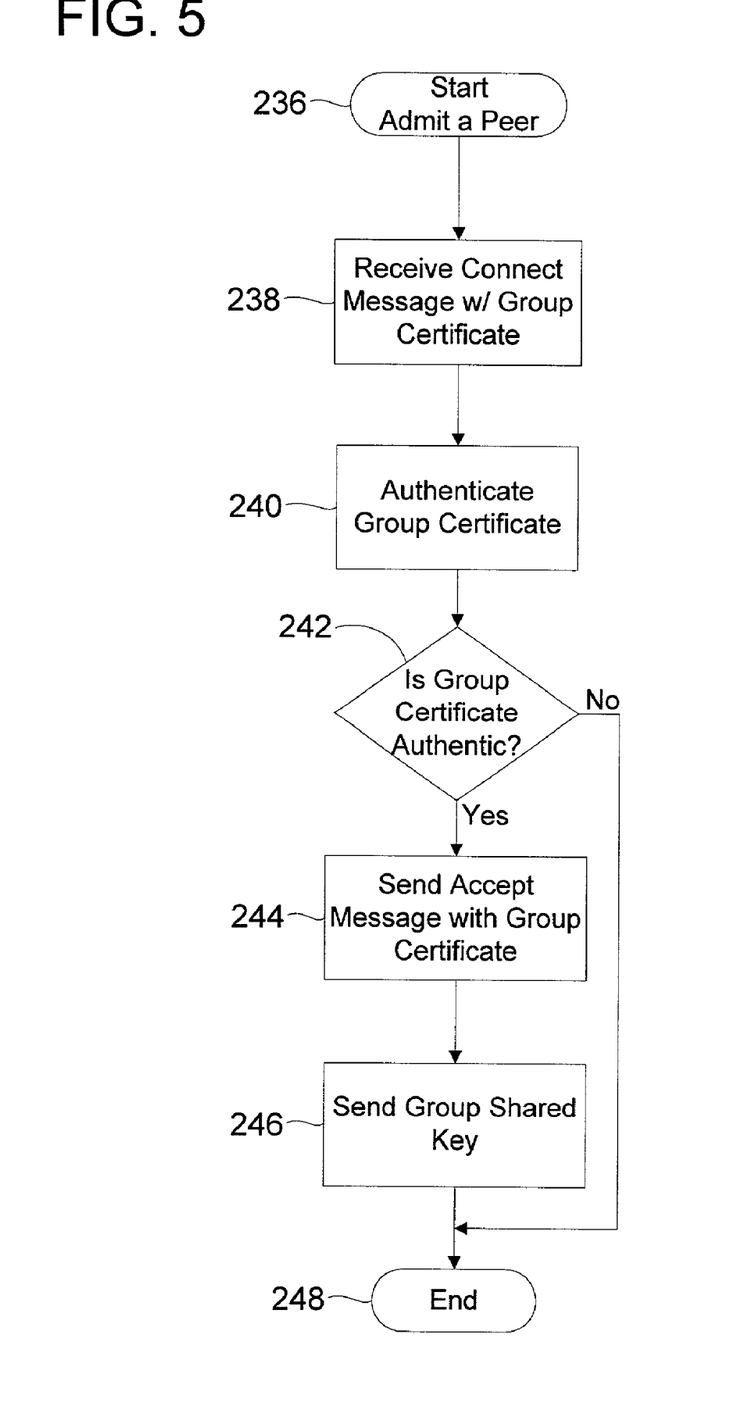
FIG. 5 is a simplified flow diagram illustrating the process of securely admitting a peer to a peer-to-peer group in accordance with an embodiment of the present invention.

As viewed from the side of U2, the process of admitting a peer into the group appears as illustrated in FIG. 5. Once started 236, U2 receives 238 the connect message with the group certificate discussed above. U2 then authenticates the group certificate at step 240. If U1's group certificate is not valid (or if any of the certificates in chain of certificates is not valid) 242, then this process ends 248. If, however, U1's certificate is authentic 242, U2 sends 244 and accept message with U2's certificate as discussed above. U2 then sends 246 the group shared key to U1 so that U1 may decrypt group traffic before ending 248.

As may be apparent from the foregoing, one problem is how the group creator gets the users' public keys. This may be accomplished through prior contact (in a group, via email, etc.). Alternatively, a mechanism such as Passport may be used to resolve an email name to the public key. Further, Owners could send mail to potential members to retrieve their key. This can be augmented with a password challenge carried in another form, e.g. a phone call/voice mail. Using the above convention, this could be represented as O1→P2P://PNRP_ID_OF_OWNER; cert=(user email name)$K_G$→U1. U1 would then click on the URL and invoke the P2P code. As discussed above, PNRP is used to resolve the owner's ID and discover its IP address. If the owner is online, then U1 sends a join message to O1. The join message contains the token signed with U1's private key and U1's Public Key (U1→join; $P_{U1}$((user email name)$K_G$) $K_{U1}$→O1). If the owner is not online, the U1 can send an automatic email response containing the Public key. For additional security, a challenge for the password exchanged out of band may be added as an additional check. Now that the owner has U1's Public Key it can proceed with the above described process to send the group invitation. As discussed above, the Owner generates an ID for each member and sends this in the invitation mail. The password may be given in voicemail. Valid IDs and the current password are distributed to all online members as part of the group shared information. Any member can then accept a connect message if the ID isupported and the Password is valid.

To demonstrate the process of sending an invitation to another peer to join a group, suppose Member_1 and Member_2 are members of a group and Member_1 invites Peer_1 to join the group. The first step of the invitation may not be confidential. Peer_1 is not a group member and she might not have a P2P identity yet. Member_1 does not have any way to encrypt the invitation it sends to Peer__1, and in this case the invitation can not be kept confidential. However, in the case when Member_1 knows the Peer ID and the public key of Peer_1 he can encrypt the invitation with Peer__1's public key. Only Peer_1 with her private key will be able to decrypt the invitation, and therefore, the invitation is kept confidential. In either case the invitation can be sent to Peer_1 via email, IM, file, or any electric delivery system.

It is desirable to make the invitation processecure enough such that even if the invitation is received by someone else, only Peer_1 can join the group using the invitation. To this end, Member_1 builds an invitation certificate in a format similar to the ID certificates discussed above. However, for the invitation certificate the <ID Related Info> now relates to the Name or ID of the party to be invited, and the authentication method. In this form, the invitation certificate becomes [Version, Group ID, Name, Name Type, GMC Serial Number, Validity, Algorithms, $P_{Sender}$]$K_{Sender}$. The Group ID is the identifier of the group for which this invitation isent, and the Name is that of the party invited in the group. This name can be a username, a Peer ID, a nickname, a hash of a shared secret, etc. The Name Type is the type of the name field (e.g. username, peer ID, nickname, shared secret hash, etc). The GMC Serial Number is the serial number of the associated group membership certificate, which is needed when the invitation is associated with a group membership certificate. As with the conventions discussed above, the Validity is the period of validity expressed in pair of From-To dates, the $P_{Sender}$ is the public key of the invitation sender, and the $K_{Sender}$ is the private key pair of $P_{Issuer}$. If the certificate issuer is the ID owner then this is $K_{ID}$, the private key of the ID. In the name field it puts Peer_1's name ashe will authenticate when she will join the group.

When Peer_1 wants to join the group for the first time, she goes back to Member_1 and presents him the invitation certificate. Member_1 verifies the certificate signature and validity. He knows that the invitation wasent by him because the certificate signature can be verified only with his public key. He then authenticates Peer_1 by the name specified in the invitation. If the authentication isuccessful Member_1 issues her a group membership.

If Member_1 passes his group membership certificate along with the invitation certificate, then Peer_1 can choose to connect to any active group member to join the group, even when Member_1 is offline. For example, suppose Peer_1 chooses to contact Member_2 who is online and, in accordance with the group security configuration, is allowed to accept new group members. Peer_1 presents to Member_2 the invitation certificate and Member_1's membership certificate. Member_2 validates the invitation certificate and Member_1's membership certificate for signature and validity. In the process, Member_2 also verifies that the GMC Serial Number in the invitation matches Member_1's membership certificate serial number. Then Member_2 looks up Member_1's membership certificate in the GCRL to see if has been revoked. Member_2 also looks in the group security configuration and, if needed, the group shared data for the list of owners to check if Member_1 has the right to send invitations for the group. If all these checks are successful, Member_2 knows that Peer_1 has a valid invitation from a valid group member that is authorized to issue group invitations. Member_2 can then authenticate Peer_1 and issue her a group membership certificate.

The system of the present invention is flexible in how group members are authenticated by allowing different authentication methods to be used. These include the verification of a previously established secret or pass phrase through phone, IM, etc., the use of a commonly trusted Internet authentication authority like Passport, the reliance on local domain security (e.g. Kerberos NTLM) if both parties are in the same security domain, the use of PKI, etc.

When a P2P Entity joins a group it contacts one of the authenticators. For groups that have owners, an authenticator is any owner, and for groups with no owner, an authenticator is any member of the group as demonstrated above. The two nodes perform a mutual authentication, that is the new member verifies that the node to which it connects is currently a member of the group. The authenticator then verifies the user's credentials using one of the above authentication methods. Note that the group creator may restrict the number of acceptable authentication methods to a subset of the above. The authentication methods that are allowed to be used when accepting new members are specified in the group properties. The authenticator generates a group membership certificate for the ID of the new member and returns it to the new member together with its chain of group membership certificates. The new member will use the group membership certificate chain to authenticate itself for all the subsequent connections to the group.

If the invitation certificate contains the hash of a shared secret, the authenticator challenges the new member to send the secret that was used to generate the hash. This scheme allows any group member to be the authenticator without any prior knowledge about the secret established between the inviter and the invitee. Since the secret isent in clear to the authenticator, the whole negotiation has to be done through an encrypted channel to maintain the secrecy of the secret.

Through the system of the present invention, a group member can connect to a group subsequent times. That is, the group membership certificate allows a P2P node to quickly reconnect to any group member. This reduces the user authentication to a common denominator in the form of validating group membership certificates. Every time a P2P node wants to reconnect to a group after it has been authenticated and authorized by one of the authenticators, it can use the chain of group membership certificates to authenticate itself as a group member.

The steps for a node N to reconnect to a group G are as follows. First, N searches for a node M that is currently connected to the group (via PNRP, etc.). Once M is found, N connects to M. N then verifies M's ID ownership and M's group membership certificate. M also verifies N's ID ownership and N's group membership certificate. M then looks up N's chain of group membership certificates in the in the group certificate revocation list (GCRL) to see if any of them has been revoked. If after this N is rejected, N can choose to re-authenticate to M or to the original authenticator to obtain a new group membership certificate.

Figure 6:
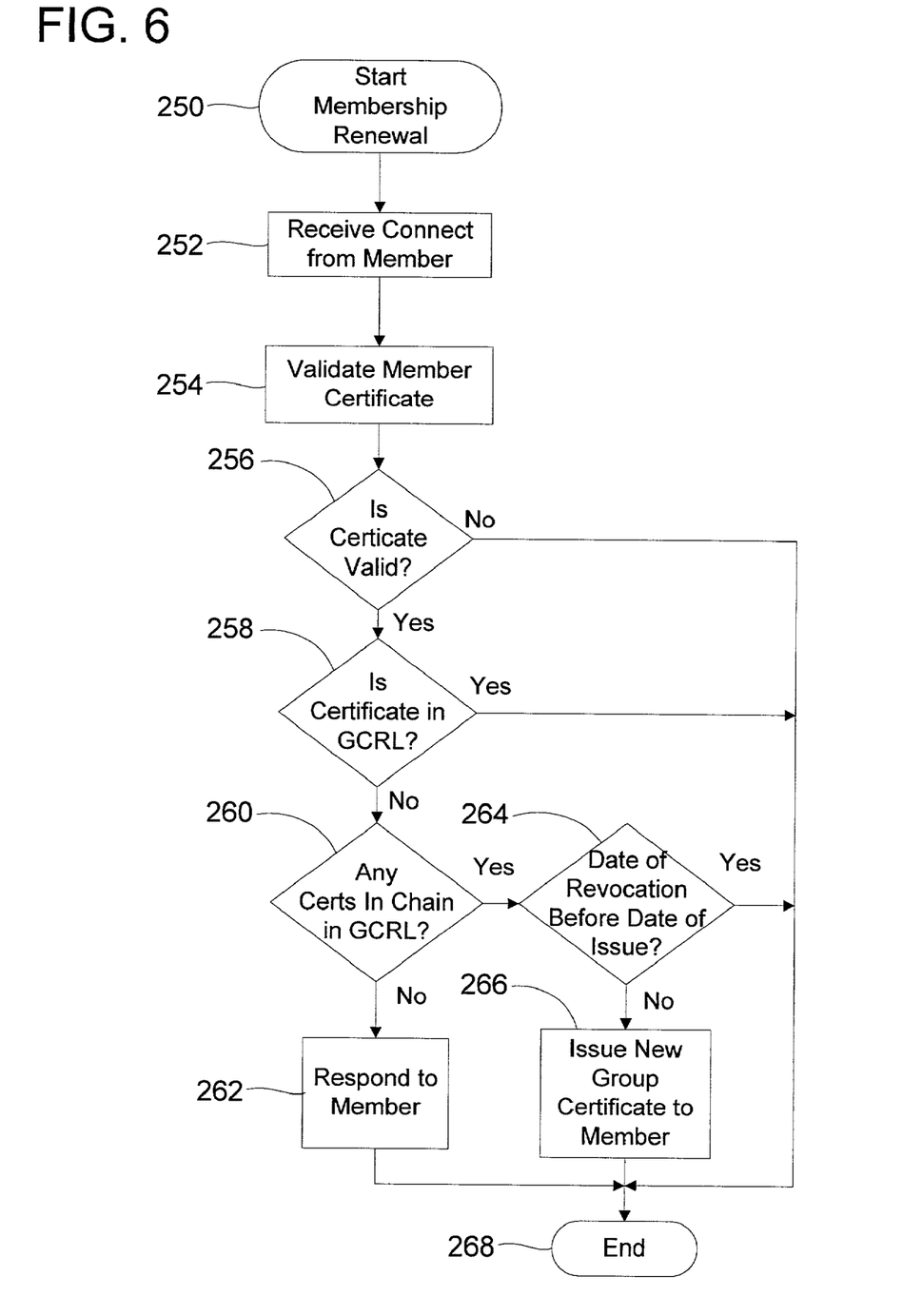
FIG. 6 is a simplified flow diagram illustrating the secure reissuing of a peer-to-peer group certificate in accordance with an embodiment of the present invention.

To renew a membership certificate, the process illustrated in FIG. 6 may be started 250. That is, N can send a connect message to any member (or only authenticators as discussed above) to M, the receipt of which is illustrated at step 252. The member first validates N's member certificate 254. If the certificate cannot be validated 256, the process ends 268 since the certificate is most likely spoofed. However, if N's certificate can be validated 256, the member next checks to see if N's certificate is published in the GCRL 258. If it is, the certificate is considered invalid and the process ends 268. Even if N's certificate is not in the GCRL, the member next checks to see if any of the certificates in the chain of certificates is published in the GCRL 260. If none of these are in the GCRL, the member simply responds 262 to N with group traffic.

However, if any of the certificates in the membership chain was revoked 260, the date of revocation of that certificate is compared to the date of issuance of N's certificate at step 264. If the revocation of the certificate is before N was issued his certificate, the entire chain is invalidated and the certificate is considered invalid. In such a case the process ends 268. However, if all of the revoked certificates in the chain were revoked after the certificate issue date, then the group member that performs the validation can choose to reissue a new group membership certificate to the certificate presenter without any additional authentication at step 266. By implementing this algorithm excluding a group member does not automatically exclude from the group all the members authenticated by that group member. In an alternate embodiment, however, excluding one group member invalidates all the group memberships issued by him by setting the revocation date of the certificate in the GCRL to the smallest possible value. Thus any membership certificatesigned by the revoked node will be revoked when the second check above is performed.

Once the group is formed, the group creator/owner is able to decide whether flooded traffic in the group isent in the clear or encrypted form. If encryption is chosen by the group creator/owner, there are at least three models that may be used. As discussed above, all traffic may be encrypted with a shared key. Thishared key is given to members when they connect into the graph. Alternatively, the traffic may be encrypted hop-to-hop. Here each node encrypts the data with its neighbor's public key before sending. The receiving node decrypts and re-encrypts for each of its neighbors. Finally, connection layer security such as IPSec or SSL may be used.

The first method is the least computational intensive. However, as will be discussed below, if a member is removed and a revocation certificate issued, a new shared key should be generated by the owner and distributed. This is necessary to prevent a disbarred member from sniffing and decrypting group traffic. However if this new key is encrypted with the current session key and then flooded, a disbarred member could still sniff this and, as they have the old shared key, they can determine the new shared key. In this case the second option should be used when flooding the new shared key to ensure the integrity of the operation.

In addition to adding or reconnecting members to a group, the system of the present invention also provides for the exclusion of members from the group asuggested above. A member of the group can be excluded from the group by the issuer of the group membership certificate. To do this, the issuer simply publishes the certificate it wants to revoke in its ICRL as $(P_U)K_G$. This ICRL will be combined into the GCRL and will be flooded and replicated to the group members for their use as discussed above. However, the dropped member will still have the group shared key as just discussed. Therefore, a new group shared key should be distributed to the remaining group members. The owner could send out the new key multiple times, each time encrypted with the public key of each remaining member $\{S_G\}P_N$. The removed members could not decrypt the key and so would be effectively excluded. However this does not scale well to large groups. An alternative method, therefore, is to use hop-by-hop security to distribute the new key. This can be done with IPSEC or SSL, or by each node encrypting the shared key with its neighbor's public key before sending. The receiving node decrypts and re-encrypts for each of its neighbors.

While it is possible to exclude members of a group, an attempted hostile exclusion of the group creator from the group is not possible because the group creator is the only node that holds the group private key. That is, the group lives as long as the holder of the group private key is a member of the group. There are cases, however, when the group creator would like to remove itself from the group. Even in this case preserving the group ID will not be possible. However, the system of the present invention implements a mechanism to smoothly transition all the current group members into a new group ID.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of inviting and joining a peer to a secure peer-to-peer group comprising the steps of:
obtaining a public key ($P_{U1}$) of a peer;
forming, by a first member of the group, a group membership certificate containing the peer's public key ($P_{U1}$) and signed with a group private key ($K_G$) of a group public/private key pair, the group membership certificate having a structure of (($P_{U1}$)$K_G$);
sending the group membership certificate from the first member to the peer to invite the peer to join the group, the group membership certificate allowing the peer to join the group through a second member other than the first member;
receiving, at a second member of the group different from the first member, a connect message from the peer containing the group membership certificate signed by a private key of the peer, the connect message requesting connection to the secure peer-to-peer group;
the second member, authenticating the group membership certificate before allowing the peer to connect to the secure peer-to-peer group; and
if the group membership certificate is authenticated, sending an accept message to the peer including a group shared key.

2. The method of claim 1, wherein the step of forming a group membership certificate comprises the step of forming a group membership certificate having a structure [Version, ID, Peer ID, Serial Number, Validity, Algorithms, $P_{ID}$, $P_{Issuer}$]$K_{Issuer}$.

3. The method of claim 1, wherein the group membership certificate in the connect message from the is signed by a private key pair of the peer's public key;
when the step of authenticating is successful,
sending an accept message to the peer, and
sending a group shared key to the peer.

4. The method of claim 3, wherein the step of authenticating comprises the steps of:
verifying that at least one signature of the group membership certificate is valid;
verifying that the group certificate certificat has not expired;
verifying that the hash of the peer's public key matches an identification of the peer;
opportunistically verifying ownership of the group membershiip certificate.

5. The method of claim 3, wherein the step of authenticating comprises the steps of:
determining if the membership certificate is listed in a group certificate revocation list (GCRL);
determining if any certificates in a chain of group membership certificates is listed in the GCRL;
when any certificates in the chain is listed in the GCRL, determining if a date of revocation of the certificate in the chain is before a date of issue of the group membership certificate; and
when the date of revocation is after the date of issue, issuing a second group membership certificate to the peer.

6. The method of claim 1, further comprising the step of generating a group shared key to be used to encrypt group traffic.

7. A computer-readable medium having computer-executable instructions for performing the steps of claim 1.

8. In a secure peer-to-peer group having a predefined public/private key pair ($P_G/K_G$), a method of inviting a peer to join the group, comprising the steps of:
obtaining a public key ($P_{U1}$) of a peer by a first member of the peer-to-peer group;
forming by the first member a first group membership-certificate containing the peer's public key ($P_{U1}$) and a second group membership certificate signed with the group private key ($K_G$), and signed with a private key of the first member ($K_{U2}$), the second group membership certificate having a structure of (($P_{U1}$)$K_G$)$K_{U2}$);
sending the first and second group membership certificates from the first member to the peer to invite the peer to join the group;
receiving, at a second member different from the first member, a connect message from the peer containing the first group membership and;
if the first group membership certificate is authenticated, sending an accept message to the peer including a group shared key.

9. The method of claim 8, wherein the connect message from the peer-contains a third group certificate comprises the first group membership certificate signed by a private key pair of the peer's public key;
authenticating the third group certificate; and
when the step of authenticating is successful,
sending an accept message to the peer from the second member, and
sending a group shared key to the peer from the second member.

10. The method of claim 9, wherein the steps of authenticating comprises the steps of:
verifying that a signature of the third group certificate is valid;
verifying that the third group ceritficate has not expired;
verifying that a hash of the peer's public key matches a peer indentification;
opportunistically verifying ownership of the third group certification.

11. The method of claim 9, wherein the step of authenticating comprises the steps of:
determining if the third group certificate is listed in a group certificate revocation list (GCRL);
determining if either of the first and second group membership certificate is listed in the GCRL;
when either of the first and second group membership certificates is listed in the GCRL, determining if a date of revocation is before a date of issuance of the third group certificate; and
when the date of revocation is after the date of issuance, issuing a new group certificae to the peer.

12. A computer-readable medium having computer-executable instructions for performing the steps of claim 8.

13. A method of securely joining a peer-to-peer group by a peer having a public key ($P_{U1}$) and a private key ($K_{U1}$), comprising the steps of:
receiving a group invitation from a first member containing an invitation certificate a group ID, the invitation certificate including the public key of the peer ($P_{U1}$) signed by a private key ($K_G$) of the peer-to-peer group;
resolving the group ID to find a third member of the group different from the first member;
sending a connect message to the third member containing the invitation certificate signed with the private key ($K_{U1}$) of the peer and having a structure of (($P_{U1}$)$K_G$) $K_{U1}$;

receiving an accept message from the third member containing a group membership certificate signed by a private key ($P_3$) of the third member; and receiving a group shared key to enable decryption of group traffic.

14. The method of claim 13, further comprising the step of authenticating the group membership certificate signed by the private key of the third member to ensure the member's association with the group.

15. The method of claim 14, further comprising the step of resolving the group ID to find a second member of the group to which to connect when the step of authenticating the group membership certificate signed by the private key of the third member fails.

16. The method of claim 14, wherein the step of authenticating comprises the steps of:
   verifying that a signature of the group membership certificate is valid;
   verifying that the group membership certificate has not expired;
   verifying that the hash of the third member's public key matches a member identification;
   opportunistically verifying ownership of the group membership certificate.

17. The method of claim 13, wherein the step of receiving a group invitation from a first member containing an invitation certificate having a group ID provided therein comprises the step of receiving a group invitation from a first member containing an invitation certificate and a group membership certificate; and
   wherein the step of resolving the group ID to find a member of the group comprises the step of resolving the group ID to find a second member of the group; and
   wherein the step of sending a connect message to the member containing the invitation certificate signed with the private key comprises the step of sending a connect message to the second member containing the invitation certificate and the group membership certificate from the first member.

18. A computer-readable medium having computer-executable instructions for performing the steps of claim 13.

19. A method of securely admitting a peer to a peer-to-peer group, comprising the steps of:
   receiving at a first member of the peer-to-peer group, a connect message from the peer containing an invitation certificate generated by a second member of the peer-to-peer group and signed by a private key ($K_{U1}$) of the peer, the first member being different from the second member, the invitation certificate containing a public key of the peer ($P_{U1}$) signed by a group private key ($K_G$), the invitation certificate signed by the private key ($K_{U1}$) of the peer having a structure of $((P_{U1})K_G)K_{U1}$;
   authenticating the invitation certificate signed by the peer's private key ($K_{U1}$); and when the step of authenticating isuccessful,
   sending an accept message to the peer from the first member, and
   sending a group shared key to the peer.

20. The method of claim 19, wherein the step of authenticating comprises the steps of:
   verifying that a signature of the invitation certificate is valid;
   verifying that the invitation certificate has not expired;
   verifying that a hash of public key of the peer matches a peer identification of the peer.

21. The method of claim 19, wherein the connect message from the peer further contains a goup membership certificat from the second member.

22. The method of claim 21, wherein the step of authenticating comprises the steps of:
   determining if the group membership certificate is listed in a group certificate revocation list (GCRL);
   when the group membership certificate is listed in the GCRL, determining if a date of revocation of the group membership certificate is before a date of issuance of the invitation certificate; and
   when the date of revocation is after the date of issuance, issuing a new group membership certificate to the peer.

23. A computer-readable medium having computer-executable instructions for performing the steps of claim 19.

* * * * *